(12) United States Patent
Fokkelman et al.

(10) Patent No.: US 9,181,834 B2
(45) Date of Patent: Nov. 10, 2015

(54) METHOD AND DEVICE FOR ADAPTING THE INJECTION AGENT SUPPLY IN AN INJECTION SYSTEM, AND EXHAUST GAS AFTERTREATMENT SYSTEM

(75) Inventors: Joris Fokkelman, Tegernheim (DE); Ingo Koops, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1188 days.

(21) Appl. No.: 13/133,982

(22) PCT Filed: Nov. 23, 2009

(86) PCT No.: PCT/EP2009/065648
§ 371 (c)(1),
(2), (4) Date: Jun. 10, 2011

(87) PCT Pub. No.: WO2010/066564
PCT Pub. Date: Jun. 17, 2010

(65) Prior Publication Data
US 2011/0239625 A1 Oct. 6, 2011

(30) Foreign Application Priority Data

Dec. 10, 2008 (DE) .......................... 10 2008 061 472
May 29, 2009 (DE) .......................... 10 2009 023 325

(51) Int. Cl.
*F01N 3/00* (2006.01)
*F01N 3/20* (2006.01)

(52) U.S. Cl.
CPC ................ *F01N 3/206* (2013.01); *F01N 3/208* (2013.01); *F01N 2610/02* (2013.01);
(Continued)

(58) Field of Classification Search
CPC ............ F01N 2610/02; F01N 2610/03; F01N 2610/14; F01N 2610/146; F01N 2900/1806; F01N 2900/1808; F01N 3/206; F01N 3/208; Y02T 10/24

USPC .......................... 60/274, 286, 295, 301, 303
See application file for complete search history.

(56) References Cited

U.S. PATENT DOCUMENTS 5,522,218 A * 6/1996 Lane et al. ....................... 60/274
6,041,594 A * 3/2000 Brenner et al. .................. 60/309
(Continued)

FOREIGN PATENT DOCUMENTS

CN 101165997 A 4/2008 .............. B60C 23/04
DE 19947197 A1 4/2001 .............. B01D 53/90
(Continued)

OTHER PUBLICATIONS

International PCT Search Report and Written Opinion, PCT/EP2009/065648, 13 pages, Mar. 16, 2010.
(Continued)

*Primary Examiner* — Diem Tran
(74) *Attorney, Agent, or Firm* — Slayden Grubert Beard PLLC

(57) ABSTRACT

In a method and a device for adapting the injection agent supply for an emission control system, the following steps are carried out: a) setting of a agent pressure target value in the line upstream of the pump in relation to the ambient pressure; b) opening of the pressure relief valve for a predetermined time t; c) determining the pressure difference between the target and the injection agent pressure, caused in step b), immediately after step b); d) setting a target value for the agent pressure in the line downstream of the pump in relation to the exhaust gas pressure in the system; e) opening of the injector for a predetermined time t; f) determining the pressure difference between the target and the agent pressure, caused in step e), immediately after step e); g) comparing the pressure differences from steps c) and f); and h) optional adaptation of the injector opening time.

16 Claims, 1 Drawing Sheet

(52) U.S. Cl.
CPC ........ *F01N 2610/03* (2013.01); *F01N 2610/14* (2013.01); *F01N 2610/146* (2013.01); *F01N 2610/1473* (2013.01); *F01N 2900/0411* (2013.01); *F01N 2900/1806* (2013.01); *F01N 2900/1808* (2013.01); *Y02T 10/24* (2013.01)

(56) References Cited

U.S. PATENT DOCUMENTS

| | | | |
|---|---|---|---|
| 6,470,673 B1 | 10/2002 | van Nieuwstadt et al. | 60/274 |
| 7,000,586 B2 | 2/2006 | Kato | 123/305 |
| 7,743,605 B2 | 6/2010 | Katou et al. | 60/287 |
| 2001/0008083 A1 | 7/2001 | Brown | 73/146 |
| 2003/0145580 A1* | 8/2003 | Ripper et al. | 60/286 |
| 2004/0047783 A1* | 3/2004 | Huber et al. | 423/235 |
| 2006/0087420 A1 | 4/2006 | Walraet | 340/445 |
| 2006/0142911 A1 | 6/2006 | Allard et al. | 701/33.9 |
| 2006/0236679 A1 | 10/2006 | Meyer et al. | 60/286 |
| 2008/0276601 A1 | 11/2008 | Katou et al. | 60/287 |
| 2011/0239625 A1 | 10/2011 | Fokkelman et al. | 60/274 |

FOREIGN PATENT DOCUMENTS

| | | | |
|---|---|---|---|
| DE | 102004024388 A1 | 12/2005 | B60C 23/04 |
| DE | 102008000272 A1 | 8/2008 | F01N 3/10 |
| EP | 114991 A2 | 10/2001 | F01N 3/20 |
| EP | 1669221 A1 | 6/2006 | B60C 23/04 |
| EP | 2034147 A1 | 3/2009 | F01N 3/18 |
| JP | 2004346854 A | 12/2004 | F01N 3/08 |
| WO | 2007/104130 A1 | 9/2007 | F02B 43/00 |
| WO | 2010/066564 A1 | 6/2010 | F01N 3/20 |

OTHER PUBLICATIONS

Chinese Office Action, Application No. 200980127427.5, 9 pages, Dec. 3, 2012.

Chinese Office Action, Application No. 200980149667.5, 13 pages, Dec. 5, 2012.

* cited by examiner

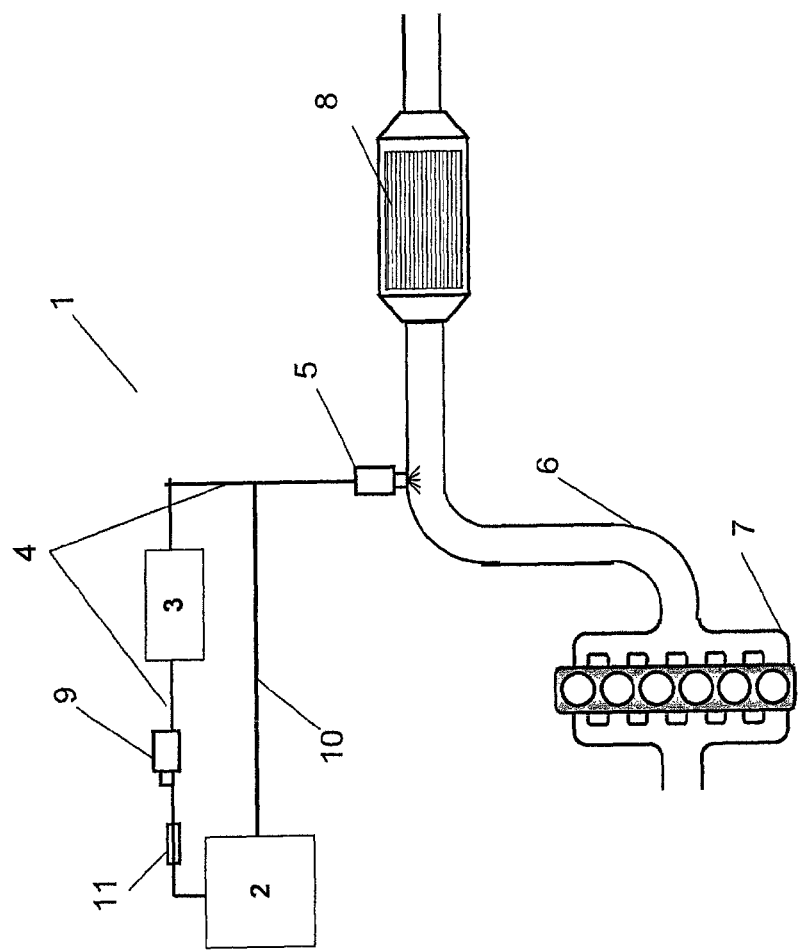

METHOD AND DEVICE FOR ADAPTING THE INJECTION AGENT SUPPLY IN AN INJECTION SYSTEM, AND EXHAUST GAS AFTERTREATMENT SYSTEM

CROSS-REFERENCE TO RELATED APPLICATIONS

This application is a U.S. National Stage Application of International Application No. PCT/EP2009/065648 filed Nov. 23, 2009, which designates the United States of America, and claims priority to German Application No. 10 2008 061 472.6 filed Dec. 10, 2008 and German Application No. 10 2009 023 325.3 filed May 29, 2009, the contents of which are hereby incorporated by reference in their entirety.

TECHNICAL FIELD

The invention relates to a method for adapting the injection medium supply in an injection system, to a device for carrying out said method, and to an exhaust-gas aftertreatment system.

BACKGROUND

For the reduction of pollutants, in particular for the reduction of nitrogen oxides and for the regeneration of diesel particle filters, different methods have become established in which reducing fluids (gases or liquids) are introduced into the exhaust system of an internal combustion engine.

To reduce nitrogen oxides, SCR (selective catalytic reduction) technology has proven to be particularly expedient, in which the nitrogen oxides (NOx) contained in the exhaust gas are selectively reduced, by means of ammonia or a corresponding precursor substance that can be converted to ammonia, to form nitrogen and water. Here, use is preferably made of aqueous urea solutions. The urea solution is hydrolyzed by means of hydrolysis catalytic converters, or directly on the SCR catalytic converter, to form ammonia and carbon dioxide. For this purpose, the urea solution is injected into the exhaust-gas flow upstream of the hydrolysis catalytic converter or the SCR catalytic converter by means of special dosing systems. This results firstly in the problem of determining the optimum reducing agent quantity, but secondly also that of ensuring the reliable supply and dosing of the reducing agent.

If reliable dosing is not ensured, it is not possible to attain efficient removal of nitrogen oxides (NOx) from the exhaust gas. On the one hand, an overdosing of reducing agent can lead to undesired emissions, for example of ammonia, a so-called reducing agent breakthrough. On the other hand, an underdosing can lead to inadequate reduction of the nitrogen oxides. The same also applies correspondingly to the regeneration of diesel particle filters, which takes place by means of an injection of fuel.

In the case of liquid reducing agents, such as the conventional urea solutions or fuel, the dosing may be carried out by means of an injector. Here, the activation time and therefore the opening time of the injector are decisive of the quantity of reducing agent supplied to the exhaust-gas aftertreatment system.

To attain the most effective atomization possible, high injection pressures are used. This simultaneously has the advantage that the ammonia can be released from the reducing agent solution more easily. For this purpose, the injector is connected via a line to the reducing agent pump.

To determine the actual amount of reducing agent injected, the nominal quantity of an injection is set to a constant value, and only the interval times between the injections are varied if required. The constant nominal quantity is set by virtue of a constant activation period of the injector being determined which corresponds to a constant injection quantity. Here, it is important that the same reducing agent quantity can always be expected for a certain activation period. Over the course of time, therefore, as a result of the variation of the interval times between two injections, the injected quantity is always a multiple of the constant injection quantity. This information is important in that there has hitherto been no direct feedback from the system reflecting the actual injection quantity. It is also possible to use a variable activation period of the injector to vary the reducing agent supply. For this purpose, however, the characteristic curve of the injector must be known. It has therefore hitherto not been possible for deviations as a result of production tolerances or system aging to be taken into consideration.

In any case, it is constantly sought to be able to control the injection quantity of reducing agent dispensed through the injection system as effectively as possible during operation so as to permit an injection according to requirements in all operating states.

SUMMARY

According to various embodiments, a method for adapting the injection medium supply in an injection system can be provided, which method, in a simple manner, permits monitoring and optimization of the constancy of the supplied injection quantity and can be realized as far as possible without additional components.

According to an embodiments, a method for adapting the injection medium supply for an exhaust-gas purification system having an injection system comprising an injection medium tank, an injector, a pump which is connected to the injector via at least one line, and a pressure discharge valve arranged in a line downstream of the pump, comprises the steps: a) setting a nominal value for the injection medium pressure in the line downstream of the pump in relation to the ambient pressure, b) opening the pressure discharge valve for a predefined time t, c) determining the pressure difference, caused by the opening in step b), between the nominal value and injection medium pressure directly after step b), d) setting a nominal value for the injection medium pressure in the line downstream of the pump in relation to the exhaust-gas pressure in the exhaust-gas purification system, e) opening the injector for a predefined time t, f) determining the pressure difference, caused by the opening in step e), between the nominal pressure and injection medium pressure directly after step e), g) comparing the pressure differences from steps c) and f), and h) adapting the injector opening time if necessary.

According to a further embodiment, the sequence of steps a) to c) and/or d) to f) can be repeated one or more times. According to a further embodiment, the injection medium pressure in the line can be measured by means of a pressure sensor in the line. According to a further embodiment, the injection medium pressure can be generated by the pump. According to a further embodiment, the opening time t of the injector can be adapted such that the difference between the pressure differences from steps c) and f) is as small as possible. According to a further embodiment, ammonia or a precursor substance of ammonia, preferably a urea solution, and/or fuel can be used as injection medium.

According to another embodiments, a device for controlling an injection system for an exhaust-gas purification system, has an injection medium tank, an injector, a pump which is connected to the injector via at least one line, and a pressure discharge valve arranged in a line downstream of the pump, wherein means are provided for controlling the opening times of the injector and of the pressure discharge valve and for determining and comparing the pressure differences between a predefined nominal value of the injection medium pressure in the line and a pressure drop caused by an opening of the injector or of the pressure discharge valve.

According to a further embodiment of the device, the pressure discharge valve can be arranged in a return line which is provided between the supply line for injection medium from the pump to the injector and the injection medium tank. According to a further embodiment of the device, a pressure sensor for measuring the injection medium pressure can be arranged in the line downstream of the pump.

According to yet another embodiment, an exhaust-gas aftertreatment system may have an injection system, wherein the injection system is designed for carrying out the method as described above.

According to a further embodiment of the system, the system can be coupled to an on-board diagnostic system.

BRIEF DESCRIPTION OF THE DRAWINGS

The invention will be explained below by way of an example on the basis of the drawing.

The single FIG. 1 schematically shows the design of an injection system, controlled according to various embodiments, for an injection medium supply device for liquid reducing agent using such an injector system.

DETAILED DESCRIPTION

According to various embodiments, a method for adapting the injection medium supply into an exhaust-gas treatment system having an SCR catalytic converter for the removal of nitrogen oxides from the exhaust gas of an internal combustion engine can be provided and at least one injection medium supply device according to further embodiments, and a device for an exhaust-gas treatment system can be provided.

According to an embodiment, in a method for adapting the injection medium supply for an exhaust-gas purification system having an injection system comprising an injection medium tank, an injector, a pump which is connected to the injector via at least one line, and a pressure discharge valve arranged in a line downstream of the pump, the following steps can be carried out:

a) setting a nominal value for the injection medium pressure in the line downstream of the pump in relation to the ambient pressure,
b) opening the pressure discharge valve for a predefined time t,
c) determining the pressure difference, caused by the opening in step b), between the nominal value and injection medium pressure directly after step b),
d) setting a nominal value for the injection medium pressure in the line downstream of the pump in relation to the exhaust-gas pressure in the exhaust-gas purification system,
e) opening the injector for a predefined time t,
f) determining the pressure difference, caused by the opening in step e), between the nominal pressure and injection medium pressure directly after step e),
g) comparing the pressure differences from steps c) and f), and
h) adapting the injector opening time if necessary.

The values for the nominal value of the injection medium pressure in the line in steps a) and d) have different references. The background to this is that, in steps a) to c), it is sought to determine a pressure drop after the opening of the pressure discharge valve, wherein the pressure discharge valve allows the injection medium to escape into the surroundings outside the exhaust-gas purification system. In contrast, in steps d) to f), a pressure drop is determined after the opening of the injector, the injector injecting the injection medium into the exhaust-gas purification system which is acted on with exhaust-gas pressure. The ambient pressure and exhaust-gas pressure are generally not equal, such that said difference can advantageously be taken into consideration in the method according to various embodiments for comparing the determined pressure differences. It is possible in particular to set an equal nominal value of the injection medium pressure in each case with regard to the ambient pressure for the actuation of the pressure discharge valve or with regard to the exhaust-gas pressure for the actuation of the injector. The injection medium pressure may for this purpose be built up preferably by means of the pump. It is possible for example for an excess pressure of approximately 5 bar to be set in each case in relation to the reference pressures. The exhaust-gas pressure may be determined by pressure sensors or may be determined by exhaust-gas pressure models.

In steps g) and h), it is advantageously possible for the difference between the pressure differences from the comparison thereof with the injector opening time held constant to be used to adapt the resulting injection medium quantity extracted therefrom. A new injection quantity of injection medium may be determined for example by multiplying the previously assumed injected injection quantity with the determined pressure difference ratio from step g). Alternatively, the relationship between the determined pressure difference ratio from step g) and the injection quantity correction may be detected in advance on a test stand and stored as a characteristic map in a controller. It is also possible, on the basis of the system rigidity and the pressure difference ratio from step g), to infer the quantity of injection medium actually injected.

As injection medium, use may be made for example either of ammonia solutions or aqueous solutions of precursor substances which can be converted to ammonia, such as for example urea solutions. Furthermore, within the context of the various embodiments, fuels are however also referred to as injection media, said fuels for example being injected into the exhaust system for the regeneration of particle filters.

According to various embodiments, therefore, a method is provided by means of which a constant injection quantity can be realized in a simple manner in an injection system and by means of which monitoring of the injection quantity of the injector is made possible. In this way, with the method according to various embodiments, the reliability of the injection system can be increased without the need for great outlay for additional system components. The method according to various embodiments utilizes the fact that a pressure discharge valve, which is usually already provided, in the injection system has a very similar throughflow characteristic to the injector. The pressure discharge valve may preferably also be selected to be of identical construction to the injector. On account of the fact that the pressure discharge valve is arranged in one of the lines downstream of the pump of the injection medium system, said pressure discharge valve, in contrast to the injector, is not subjected to the loading of the exhaust gas. Also, the aging as a result of the continuous operation of the injector may, with regard to the pressure discharge valve, which is actuated only to a lesser extent than the injector, be assumed to be negligible. The pressure discharge valve is therefore particularly suitable as a reference for checking the throughflow characteristic of the injector. This fact is advantageously utilized by the method according to various embodiments for the adaptation and monitoring of the injection quantity of the injector. It is also advantageously the case in the method according to various embodiments that the reference value of the pressure discharge valve is newly determined during every run-through, such that environmental influences such as leakage or changed system rigidity can be eliminated. Furthermore, if there is too great a difference between the pressure differences determined according to various embodiments, it can be concluded that the injector is no longer functional. Such monitoring of the operating state of the injector has hitherto not been possible.

In an embodiment of the method, the sequence of steps a) to c) and/or d) to f) may be repeated one or more times. In this way, the absolute pressure difference generated by the opening of the valve or of the injector may be selected to be large enough that it can be reliably detected by pressure sensors. Here, the number of repetitions is preferably registered and stored such that a mean value can be formed.

In another embodiment, the injection medium pressure in the line downstream of the pump may be measured by means of a pressure sensor in the line. In this way, the injection medium pressure can advantageously be determined directly.

It is likewise preferable for the injection medium pressure to be generated by the pump. In this way, the setting of the nominal values as described above can be realized reliably without additional material outlay.

The opening time t of the injector may preferably be adapted such that the difference between the pressure differences from steps c) and f) is as small as possible. Specifically when using structurally identical valves for the pressure discharge valve and the injector, this permits an optimized adaptation and constancy of the injection medium quantity in a simple manner.

In a further method variant, it may be provided that ammonia or a precursor substance of ammonia, preferably a urea solution, and/or fuel is used as injection medium.

Various other embodiments also relates to a device for controlling an injection system for an exhaust-gas purification system, having an injection medium tank, an injector, a pump which is connected via at least one line to the injector, and a pressure discharge valve arranged in a line downstream of the pump, wherein means are provided for controlling the opening times of the injector and of the pressure discharge valve and for determining and comparing the pressure differences between a predefined nominal value of the injection medium pressure in the line and a pressure drop caused by an opening of the injector or of the pressure discharge valve.

As stated above, specifically in the case of high-pressure injection systems such as for example in reducing agent supply devices in exhaust-gas treatment systems, the quantity injected by the injector must be as accurate as possible. This may be made possible by means of the device according to various embodiments in a simple manner by virtue of the throughflow characteristic of the pressure discharge valve being taken into consideration as a reference for monitoring the injector and for adapting the injection quantity.

In a further embodiment of the controller, the pressure discharge valve may be arranged in a return line provided between the supply line for the injection medium from the pump to the injector and the injection medium tank.

In another embodiment of the controller, a pressure sensor for measuring the injection medium pressure may be arranged in the line downstream of the pump. In this way, a direct measured value of the injection medium pressure can be obtained, such that firstly the setting of the nominal values of the pressures and secondly the determination of the respective pressure drops can be reliably carried out for the purpose of carrying out the method according to various embodiments by means of said arrangement.

Various other embodiments also relates to an exhaust-gas aftertreatment system for carrying out the method described above.

In an embodiment, the exhaust-gas aftertreatment system is coupled to an on-board diagnostic system which can display the functionality and if appropriate a malfunction of the injection medium supply device. If for example the determined adaptation value is too high in absolute terms or in relation to the original starting value, it can be concluded from this that the injector is no longer functional, and corresponding measures can be taken by means of the on-board diagnostic system, for example, the exhaust-gas purification device can be shut down or the driver can be prompted to visit a workshop. The service life of the overall system can be considerably improved in this way.

The SCR system shown comprises an injection medium tank 2 for the injection medium. An injection medium pump 3 is arranged in the line 4. The line 4 serves for supplying injection medium liquid from the injection medium tank 2 to the injector 5. The injector 5 may be any device capable of regulating the introduction of injection medium solution into the exhaust line 6 of an internal combustion engine 7, for example of an engine of a motor vehicle. The injector 5 is positioned in the exhaust line 6 upstream of an SCR catalytic converter 8.

To detect the pressure downstream of the pump 3, a pressure sensor 11 is arranged in the line 4. A return line 10 branches off from that part of the line 4 which is situated downstream of the pump 3, by means of which return line injection medium can be conducted back to the injection medium tank 2. The pressure discharge valve 9 is arranged in the return line 10.

What is claimed is:

1. A method for adapting an injection medium supply for an exhaust-gas purification system having an injection system with an injection medium tank, an injector, a pump which is connected to the injector via at least one line, and a pressure discharge valve arranged in a line downstream of the pump, the method comprising the steps of:
   a) setting a nominal value for an injection medium pressure in the line downstream of the pump in relation to the ambient pressure,
   b) opening the pressure discharge valve for a predefined time t,
   c) determining a first pressure difference, caused by the opening in step b), between the nominal value and injection medium pressure directly after step b),
   d) setting a nominal value for an injection medium pressure in the line downstream of the pump in relation to the exhaust-gas pressure in the exhaust-gas purification system,
   e) opening the injector for a predefined time t,
   f) determining a second pressure difference, caused by the opening in step e), between the nominal pressure and injection medium pressure directly after step e),
   g) comparing the first and second pressure differences, and
   h) adapting an injector opening time if necessary.

2. The method according to claim 1, wherein the sequence of at least one of steps a) to c) and steps d) to f) is repeated one or more times.

3. The method according to claim 1, wherein the injection medium pressure in the line is measured by means of a pressure sensor in the line.

4. The method according to claim 1, wherein the injection medium pressure is generated by the pump.

5. The method according to claim 1, wherein the opening time t of the injector is adapted such that the difference between the first and second pressure differences is as small as possible.

6. The method according to claim 1, wherein ammonia or a precursor substance of ammonia and fuel is used as injection medium.

7. The method according to claim 1, wherein ammonia or a precursor substance of ammonia or fuel is used as injection medium.

8. The method according to claim 7, wherein the precursor substance is a urea solution.

9. A device configured to adapt an injection medium supply for an exhaust-gas purification system having an injection system with an injection medium tank, an injector, a pump which is connected to the injector via at least one line, and a pressure discharge valve arranged in a line downstream of the pump, the device being configured to:
   a) set a nominal value for an injection medium pressure in a line downstream of the pump in relation to an ambient pressure,
   b) open the pressure discharge valve for a predefined time t,
   c) determine a first pressure difference, caused by the opening of the pressure discharge valve, between the nominal value and the injection medium pressure directly after opening the pressure discharge valve,
   d) set a nominal value for an injection medium pressure in the line downstream of the pump in relation to the exhaust-gas pressure in the exhaust-gas purification system,
   e) open the injector for a predefined time t,
   f) determine a second pressure difference, caused by the opening of the injector, between the nominal pressure and the injection medium pressure directly after opening the injector,
   g) compare the first and second pressure differences, and
   h) adapt an injector opening time if necessary.

10. The device according to claim 9, wherein the sequence of at least one of the setting of the nominal value, opening of the pressure discharge valve and determination of the first pressure difference and the setting of the nominal value, opening of the injector and determination of the second pressure difference is repeated one or more times.

11. The device according to claim 9, wherein the injection medium pressure in the line is measured by means of a pressure sensor in the line.

12. The device according to claim 9, wherein the injection medium pressure is generated by the pump.

13. The device according to claim 9, wherein the opening time t of the injector is adapted such that the difference between the first and second pressure differences is as small as possible.

14. The device according to claim 9, wherein ammonia or a precursor substance of ammonia and fuel is used as injection medium.

15. The device according to claim 9, wherein ammonia or a precursor substance of ammonia or fuel is used as injection medium.

16. The device according to claim 15, wherein the precursor substance is a urea solution.

* * * * *